(No Model.)
H. A. PARCELLS.
SHUFFLE HOE.
No. 584,746. Patented June 15, 1897.
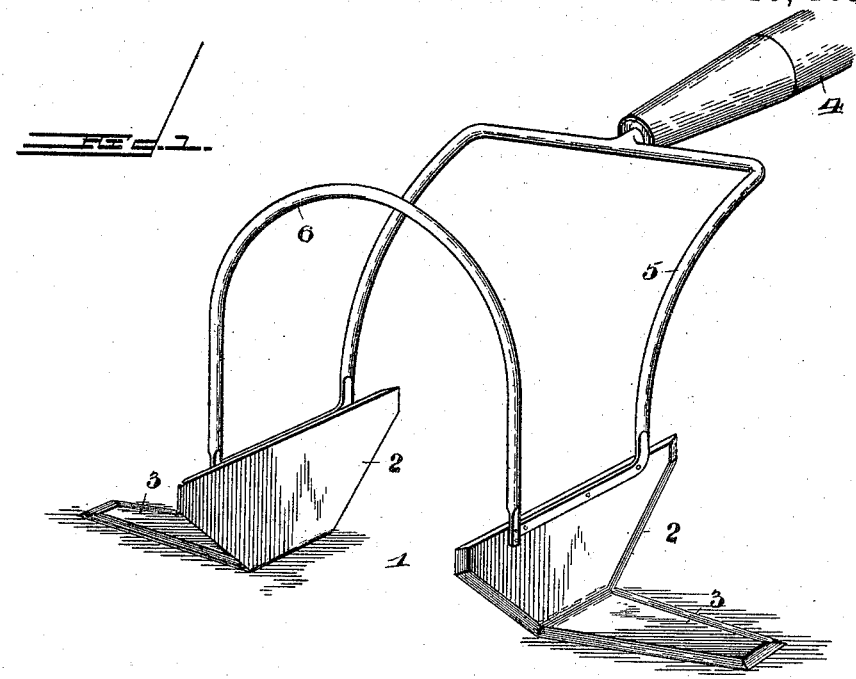
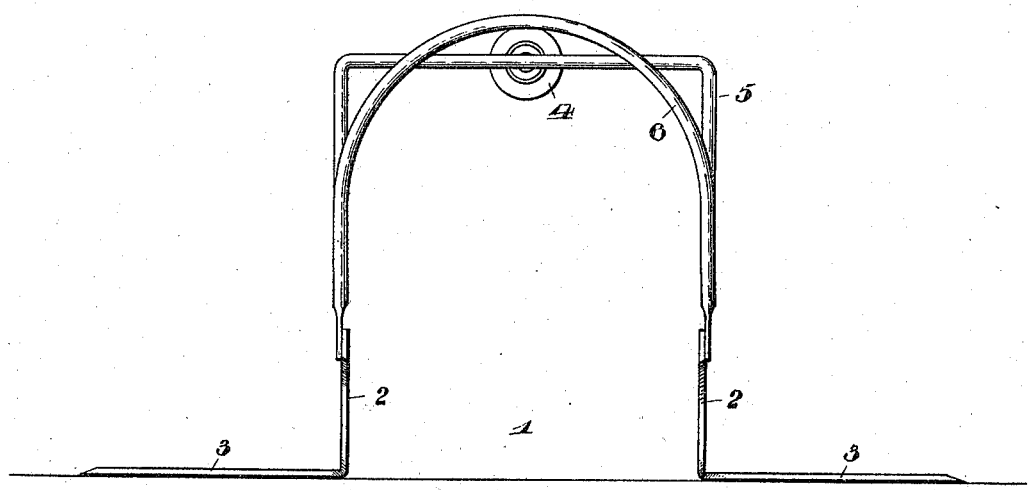
Witnesses
W. F. Doyle.
J. J. Riley
Inventor,
Henry A. Parcells,
By his Attorneys,
C. A. Snow & Co.

UNITED STATES PATENT OFFICE.

HENRY A. PARCELLS, OF DELTA, COLORADO.

SHUFFLE-HOE.

SPECIFICATION forming part of Letters Patent No. 584,746, dated June 15, 1897.

Application filed March 20, 1896. Serial No. 584,137. (No model.)

*To all whom it may concern:*

Be it known that I, HENRY A. PARCELLS, a citizen of the United States, residing at Delta, in the county of Delta and State of Colorado, have invented a new and useful Shuffle-Hoe, of which the following is a specification.

The invention relates to improvements in shuffle-hoes.

The object of the present invention is to provide a simple, inexpensive, and efficient shuffle-hoe designed especially for the cultivation of cotton and capable of straddling a row and of enabling both sides to be worked at the same time, thereby reducing the cost of labor and enabling the work to be more rapidly performed and lessening the amount of walking necessary for such cultivation.

The invention consists in the construction and novel combination and arrangement of parts hereinafter fully described, illustrated in the accompanying drawings, and pointed out in the claims hereto appended.

In the drawings, Figure 1 is a perspective view of a shuffle-hoe constructed in accordance with this invention. Fig. 2 is a front elevation of the same.

Like numerals of reference designate corresponding parts in all the figures of the drawings.

1 designates a shuffle-hoe comprising a pair of substantially L-shaped blades composed of vertical guard portions or wings 2, which are arranged parallel with each other, and a pair of laterally-extending horizontally-disposed flat cutting-blades 3, projecting from the outer sides of the guard portions or wings at the bottom thereof. The guard portions or wings extend in front and in rear of the horizontal cutting-blades and are provided with front and rear inclined cutting edges, which converge downwardly. They are designed to be arranged at opposite sides of a row and form guides for the eye of the operator, and at the forward movement of the shuffle-hoe one of the wings runs close to the adjacent side of the plants and at the rearward movement the other guide-wing runs close to its side of the plants, thereby enabling the sides of the row to be cultivated at the same time, increasing the rapidity and lessening the cost of labor and saving one-half of the walking necessary for the cultivation of the plants when a row is first worked at one side and then at the other.

The horizontal cutting blades or portions are tapered toward their outer ends and are provided at their front and rear sides and at their outer ends with cutting edges, the side edges forming continuations of the cutting edges of the guard portions or wings, and the wings are connected with a handle 4 by a fork or arch 5, having parallel sides secured at their front ends to the outer faces of the guide-wings. The guide-wings are supported at the front of the shuffle-hoe by a connecting-arch 6, consisting, preferably, of a rod curved as shown and secured at its terminals to the outer faces of the guide-wings.

It will be seen that the shuffle-hoe is exceedingly simple and inexpensive in construction, that it is adapted to cultivate both sides of a row at the same time, one guide-wing and blade cultivating one side of a row during the forward movement of it and the other guide-wing and cutting-blade operating on the other side of the row at the rearward movement of it, and that it will save one-half of the walking, increase the rapidity of the labor, and thereby lessen the cost of the same. It will also be apparent that it lightens the labor by enabling the operator to stand in an upright position and by lessening the amount of walking, as before explained, and that it will clear a row of weeds and grass and give the plants the cultivation necessary for their proper growth while they are young and liable to injury from falling earth when horse-cultivators and the like are employed.

Changes in the form, proportion, and minor details of construction may be resorted to without departing from the spirit or sacrificing any of the advantages of this invention.

What I claim is—

1. A shuffle-hoe comprising duplicate blades composed of vertical portions having front and rear inclined cutting edges converging toward the bottom of the blades, and the tapering horizontal portions extending outward from the bottoms of the vertical portions and having all of their edges sharpened to form cutting edges, the side cutting edges converging from the vertical portions of the blades and forming continuations of the cutting edges of the same, and an arch connecting the blades to cause the same to move in unison, substantially as described.

2. A shuffle-hoe comprising a pair of parallel wings provided with front and rear cutting edges, flat horizontal cutting-blades extending outward from the lower edges of the guide-wings at points intermediate of the ends thereof and provided at their sides and outer ends with cutting edges, a handle having a fork secured to the side wings at the rear ends thereof, and an arch connecting the guide-wings at the front thereof and preventing them from spreading, substantially as described.

In testimony that I claim the foregoing as my own I have hereto affixed my signature in the presence of two witnesses.

HENRY A. PARCELLS.

Witnesses:
J. A. CURTIS,
A. C. BUTLER.